United States Patent [19]

Porter et al.

[11] Patent Number: 4,589,067
[45] Date of Patent: May 13, 1986

[54] FULL FLOATING POINT VECTOR PROCESSOR WITH DYNAMICALLY CONFIGURABLE MULTIFUNCTION PIPELINED ALU

[75] Inventors: John B. Porter, Lexington; David W. Altmann, Marblehead; Bruno A. Mattedi, Andover; Ralph Jones, Waltham, all of Mass.

[73] Assignee: Analogic Corporation, Peabody, Mass.

[21] Appl. No.: 498,877

[22] Filed: May 27, 1983

[51] Int. Cl.[4] .................... G06F 15/16; G06F 9/38; G06F 7/49; G06F 7/38
[52] U.S. Cl. .................... 364/200; 364/736; 364/748
[58] Field of Search ... 364/200 MS File, 900 MS File, 364/726, 736, 741, 748, 740, 751, 761, 768

[56] References Cited

U.S. PATENT DOCUMENTS

| | | | |
|---|---|---|---|
| 3,787,673 | 1/1974 | Watson et al. | 364/200 X |
| 3,794,984 | 2/1974 | Deerfield et al. | 364/200 |
| 4,101,960 | 7/1978 | Stokes et al. | 364/200 |
| 4,228,498 | 10/1980 | Moshier | 364/200 |
| 4,281,391 | 7/1981 | Huang | 364/746 |
| 4,302,818 | 11/1981 | Niemann | 364/736 |
| 4,371,951 | 2/1983 | Kort et al. | 364/900 |
| 4,414,669 | 11/1983 | Heckelman et al. | 371/49 |
| 4,489,434 | 12/1984 | Moshier | 381/43 |
| 4,490,786 | 12/1984 | Nakatani | 364/200 |
| 4,496,944 | 1/1985 | Collmeyer et al. | 340/723 |
| 4,507,728 | 3/1985 | Sakamoto et al. | 364/200 |
| 4,525,796 | 6/1985 | Omoda et al. | 364/730 |

Primary Examiner—James D. Thomas
Assistant Examiner—A. Williams
Attorney, Agent, or Firm—David W. Gomes; Albert P. Durigon

[57] ABSTRACT

A full floating point vector processor includes a master processing unit having DMA I/O means, a wide bandwidth data memory having static RAM and/or interleaved dynamic RAM, an address generator operative to provide address generation for data loaded in the data memory, a concurrently operating pipeline control sequencer operative to provide fully programmable horizontal format microinstructions synchronously with the addresses generated by the address generator, and a pipelined arithmetic and logical unit responsive to the addressed data and to the synchronously provided microinstructions and operative to evaluate one of a user selectable plurality of computationally intensive functions. The address generator, the pipeline controlsequencer, and the master processing unit are configured in parallel. The address generator includes means operative to provide pipeline input and output data dependent address generation. The microinstruction controlled pipelined arithmetic and logical unit includes two register files controllably interconnectable over feedforward and feedback data flow paths, a user selectable fixed or floating point format multiplier, a user selectable fixed or floating point format arithmetic and logical unit, and a sign latch coupled between the arithmetic and logical unit and one of the register files. The sign latch microinstruction control is operative to provide the arithmetic and logical unit with a data dependent decison making capability. A microinstruction controlled write address FIFO and a read address FIFO are coupled to the data memory.

35 Claims, 10 Drawing Figures

FULL FLOATING POINT VECTOR PROCESSOR WITH DYNAMICALLY CONFIGURABLE MULTIFUNCTION PIPELINED ALU

FIELD OF THE INVENTION

This invention is drawn to the field of data processing, and more particularly, to a novel full floating point vector processor.

BACKGROUND OF THE INVENTION

In the effort to obtain the fastest possible computational throughput, digital computer architecture generally employs either parallel or pipeline processing techniques and the fastest-available cost-effective hardware. Parallel processing divides the data to be processed among concurrently operating arithmetic and logical units thereby obtaining faster processing by a factor that depends upon the number of individual, concurrently operating, arithmetic and logical units utilized. Pipeline processing divides the function to be evaluated into separable operations that are implemented in serially connected and latched pipeline stages. The data to be processed is streamed through the pipeline thereby obtaining faster processing by a factor that depends upon the number of pipeline stages utilized. Vector processors are commonly employed for the important class of problems calling for the repetitive evaluation of a computationally intensive function on blocks of data arrayed into sets or vectors. In such machines, the pipeline is typically configurable in one of a plurality of architectures each corresponding to a preselected function to be evaluated on sequentially applied data vectors. In the known vector processors, vector data I/O, vector data address generation, and pipeline control are interdependently performed which presents a material impediment to system throughput. In addition, system throughput is limited by the dependence of memory cycle timing on the absolute values of the addresses, and by the failure of the pipeline architectures to attain 100 percent utilization of the pipeline arithmetical units for each one of a plurality of functions to be evaluated, among other things.

SUMMARY OF THE INVENTION

The novel vector processor of the present invention combines parallel and pipeline architecture to provide a system capable of evaluating a plurality of computationally intensive functions on vector data having either a fixed or a floating point format that provides high data throughput in a manner involving a comparatively low-cost hardware implementation, and a straight-forward software approach. The full floating point vector processor of the present invention is capable of multimode operation in one of a multiprocessor tightly-coupled mode, a multiprocessor loosely-coupled and shared resources mode, and an uncoupled uniprocessor stand alone mode. The floating point vector processor of the present invention includes a pipelined arithmetic and logical unit, a bit-slice address generator, a local vector data memory, and a master processing unit configured in a user-transparent parallel architecture and is operative to provide concurrent vector data read and write address generation, pipeline control microcode, vector data I/O, and on-the-fly format conversion. The bit-slice address generator, controlled by the master processing unit, is operative to provide upon the occurrence of each clock pulse the address for the next data vector to be streamed into the pipeline. The pipeline control sequencer, controlled by both the address generator and the master processing unit, is operative to synchronously provide upon the occurence of each clock pulse the next output code which configures the pipelined arithmetic and logical unit for the particular phase of the function evaluation corresponding to that clock pulse. The data is serially read from the data memory for evaluation in the pipelined arithmetic and logical unit from the read data address location therefor specified by the address generator, and is written back into the data memory after function evaluation to the write data address specified therefor by the address generator under control of the pipeline control sequencer. The pipelined arithmetic and logical unit includes a pair of register files designated M and Z, a user selectable fixed or a floating point format multiplier, and a user selectable fixed or a floating point format arithmetic and logical unit. The M and the Z files are selectively interconnected by means including both feedforward and feedback paths selectable under control of the pipeline control sequencer. For each clock pulse, each of the M and the Z register files perform two reads and two writes, where one of the writes is to an address specified for a read. Direct memory addressing and programmed input/output are employed for vector data I/O into and out of the data memory. A RS-232 interface is provided, among other things, for independent operation of the full floating point vector processor in the un-coupled stand alone mode; a MULTIBUS interface is provided, among other things, for interfacing the master processing unit to external peripherals in the loosely-coupled and shared resources mode; and a UNIBUS interface is provided, among other things, for interfacing the master processing unit to a general purpose host computer for operation in the tightly-coupled mode. Two auxiliary I/O ports are provided, among other things, for interfacing the data memory, for example, to analog devices such as input signal processors and output display graphics. The data memory includes static RAM and comparatively low cost and wide bandwidth interleaved dynamic RAM.

BRIEF DESCRIPTION OF THE DRAWING

The invention will become better understood by referring to the following exemplary and non-limiting detailed description of the preferred embodiment, and to the drawings, wherein.

DETAILED DESCRIPTION OF THE PREFERRED EMBODIMENT

Figure 1:
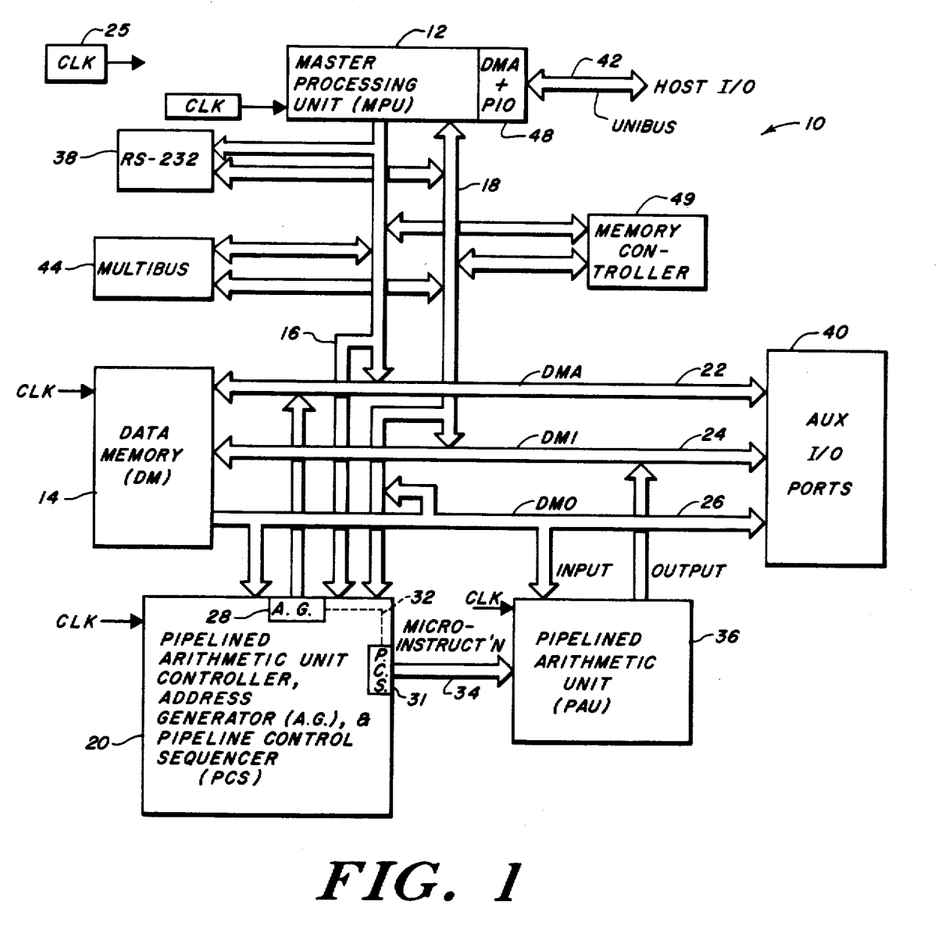
FIG. 1 is a functional block diagram of the full floating point vector processor according to the present invention.

Referring now to FIG. 1, generally shown at 10 is a functional block diagram of a novel floating point vector processor according to the present invention. The floating point vector processor 10 includes a master processing unit (MPU) 12, preferably a Motorola MC 68,000 chip, that is memory-mapped to a data memory (DM) peripheral 14 and to a memory-mapped pipelined arithmetic unit controller (PAUC) 20 via a master processing unit address bus 16 and a master processing unit data bus 18. The data memory 14 preferably is static RAM and/or interleaved dynamic RAM to be described that has wide memory bandwidth. A data memory address (DMA) bus 22, a data memory input (DMI) bus 24, and a data memory output (DMO) bus 26 are connected to the data memory 14 in the usual manner. The master processing unit address bus 16 is coupled to the data memory address bus 22, and to the pipelined arithmetic unit controller 20. The master processing unit data bus 18 is coupled to the data memory input bus 24, to the data memory output bus 26, and to the pipelined arithmetic unit controller 20. A clock 25, coupled to the MPU 12, to the DM 14, to the PAUC 20, and to a PAU 36 to be described, is operative in the usual manner to provide a clocking signal for controlling system timing.

The pipelined arithmetic unit controller 20 includes an address generator 28 designated A.G. to be described connected to the data memory address bus 22 for supplying addresses to the data memory 14 once every memory cycle. The address generator 28 is tightly-coupled to a pipeline control sequencer 31 designated P.C.S. to be described as schematically illustrated by a dashed line 32. The pipeline control sequencer 31 is operative to provide instructions over an instruction bus 34 once every (CLK) clock pulse. The pipelined arithmetic unit 36 to be described is connected to the instruction bus 34 of the pipeline control sequencer 30, to the data memory output bus 26, and to the data memory input bus 24. As will appear more fully below, one memory cycle preferably equals two clock pulses.

Input and output (I/O) capability is provided to the system 10 over one of a plurality of interfaces that includes auxiliary I/O ports 40 operatively connected to the data memory 14, a RS-232 serial port 38, a UNIBUS or other standard host interface 42, and a MULTIBUS interface 44. The RS-232 serial port 38 is operatively connected to the address and data buses of the master processing unit 12 and provides user-selectable transmission rates to 19.2K baud. The host UNIBUS I/O interface 42 is connected to conventional direct memory address (DMA) and programmed input output (PIO) controllers 48 in the usual manner. The MULTIBUS interface 44 is operatively connected to the address and data buses of the master processing unit 12. A memory controller 49, connected to the address and the data buses 16 and 18, provides the system with a data movement capability between selected pairs of the program memory of the master processing unit 12, the data memory 14, the control store of the address generator 28, the control store of the pipeline control sequences 31, and the MULTIBUS 44 and UNIBUS 42 I/O interfaces. The auxiliary I/O ports 40 preferably are two 6.00 Mhz bidirectional 16 bit data channels gangeable to provide a single 32 bit channel if desired. Either the two 16 bit channels or the ganged 32 bit channel provide buffered DMA access between the data memory 12 and externally connected devices such as an A/D convertor for signal processing, and/or an externally connected D/A converter for graphic displays, and/or to a data modem for data transmission to and from other processing units, all not shown. The UNIBUS interface 42 provides complete DMA and PIO access to most presently-available general purpose digital computers, and the MULTIBUS interface 44 provides a 500 Khz bidirectional, direct data, program, and control I/O bus suitable for connection to a magnetic disc, a magnetic tape, an image display, another processing unit, another vector processor, and to a local area network, among other things, all not shown.

The system 10 is capable of multimode operation in one of a tightly-coupled mode, a loosely-coupled mode, and in an uncoupled mode. In the tightly-coupled mode, the system 10 is interfaced to a host computer, not shown, over the UNIBUS 42. Software, resident in the host, controls system data aquisition, function evaluation in the pipeline 36, and output data writes to the host. In the loosely-coupled mode, the system 10 typically processes data acquired through direct DMA I/O via either the auxiliary ports 40 or the MULTIBUS interface 44. After having been down loaded with software over either the UNIBUS interface 42 or over the MULTIBUS interface 44, the system 10 is operable with MPU 12 resident software and can process data acquired through DMA and/or PIO either via the auxiliary ports 40 or the MULTIBUS interface 44. In the uncoupled standalone mode, the system 10 itself performs function evaluation and data I/O from software resident internally. In the uncoupled mode, software is loaded into the master processing unit 12 programmable memory, now shown, over the RS-232 serial line 38 and data is again provided either over the auxiliary I/O interface 40 or the MULTIBUS interface 44.

In any one of the stand-alone, loosely coupled, or tightly coupled modes, the master processing unit 12 is operative to enable the DMA and PIO controller 48 for writing data to be processed directly into the data memory 14 from one of the auxiliary I/O interface 40, the host I/O interface 42, or the MULTIBUS I/O interface 44 in accordance with the mode selected. Concurrently with direct memory addressing, the master processing unit 12 enables the pipelined arithmetic controller 20, and writes address generator instructions into address generator RAM to be described at specified addresses therein using the master processing unit address bus 16 and the master processing unit data bus 18. The MPU 12 is then operable to write pipeline control sequencer microinstructions into program control sequencer RAM to be described over the master processing unit address bus 16 and data bus 18, and to write in address generator registers start addresses for both the address generator 28 and the pipeline control sequencer 31 and parameter values for use during address generation via the master processing unit address bus 16 and the master processing unit data bus 18.

After performing the above-described initialization sequence, the master processing unit 12 starts the address generator 28. The address generator 28 then jumps to the start address for the particular address generator control loop specified in the address generator start register and starts execution of the address generator control algorithm there specified and is operative to generate addresses on the data memory address bus 22 for each memory cycle. The pair of data values to be described specified by each such address is written from the data memory 14 onto the data memory output bus 26. After a predetermined time delay selected to match the time it takes for data to be addressed and written onto the data memory output bus 26, the address generator 28 provides a control signal that enables the pipeline control sequencer 30 and loads the pipeline control sequencer 30 with the start address for the particular function to be evaluated in the pipelined arithmetic unit 36. The pipeline control sequencer 30 then jumps to the start address specified and is operative to sequentially provide microinstructions over the bus 34 for controlling at each clock pulse the pipelined arithmetic unit 36. The pipelined control sequencer and address generator concurrently provide synchronized microinstructions and data values which are applied to the pipeline arithmetic unit 36. The data is streamed through the pipeline which is controllably configured by the microinstructions. After selected function evaluation is completed, the data representative of the evaluated function is written back into the data memory 14 over the data memory input bus 24. Thereafter, the same function may be repetitively evaluated on new data. If a different function evaluation is to be performed, the master processing unit 12 enables the address generator 20 to load into the pipeline control sequencer start address register that start address that corresponds to the location of the initial instruction of the newly selected function to be evaluated, and the process is repeated.

Figure 2:
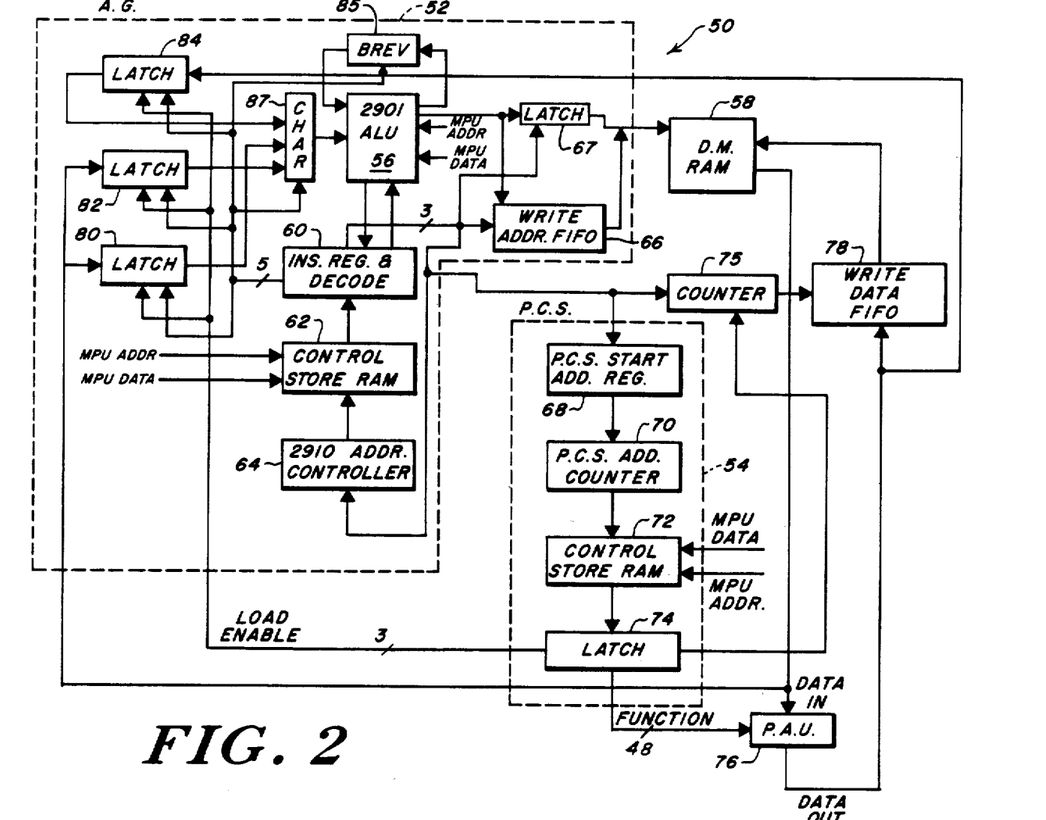
FIG. 2 is a block diagram of the pipelined arithmetic unit controller of the full floating point vector processor according to the present invention.

Referring now to FIG. 2, generally shown at 50 is a block diagram of a pipelined arithmetic unit controller of the full floating point vector processor of the present invention. The pipelined arithmetic unit controller 50 includes an address generator (A.G.) designated by a dashed block 52 coupled to a pipeline control sequencer (P.C.S.) designated by a dashed block 54. The address generator 52 receives algorithm parameters from the master processing unit 12 (FIG. 1) and supplies synchronized memory addresses to a data memory 58 for pipeline data writes and reads. The address generator 52 includes an arithmetic and logical unit 56, preferably multiple 2901 bit-slice chips, operative to sequentially supply the data memory read addresses that specify the locations of the data values to be streamed into the pipeline and to sequentially supply the data memory write addresses that specify the data memory write locations into which the pipeline output data values are written after function evaluation. The registers of the arithmetic and logical unit 56 are loaded over the MPU address and data buses during the above-described initialization sequence with parameter values used during address generation.

Instructions are sequentially provided to the arithmetic and logical unit 56 for execution from an instruction register and decoder 60, which is written from an address generator instruction control store RAM 62 under control of an address controller 64. The address controller 64, preferably a 2910 chip, sequentially generates the address of the instructions of a selected address generator control algorithm stored in the RAM 62. As above-described, the control store RAM 62 is written by the master processing unit during initialization and contains at individual addressable locations thereof instructions for a plurality of address generator control loops, each of which includes start-up and termination routines. The instruction register and decoder 60 is connected in a feedback loop to the address controller 64 which is operative to recognize the current instruction and to generate in accordance therewith the address for the next instruction in the selected control loop in the RAM 62.

In operation, the address generator 52 is enabled by the master processing unit 12 (FIG. 1) and does a jump to address location zero, where the start address for the selected algorithm control loop to be executed is stored by the master processing unit during initialization. The instruction corresponding to the address specified in the start address register is read from the address generator control store RAM 62 and written into the instruction register and decoder 60. The arithmetic and logical unit 56 executes the instruction and provides a memory address to the data memory 58 in accordance therewith. The address controller 64 then controllably increments its count to the next sequential address or to a jump address in dependence on the selected algorithm and in accordance with status information provided thereto from the arithmetic and logical unit 56, and sends to the address generator control store 62 the address for the next instruction of the selected address generator control loop to be executed by the arithmetic and logical unit 56, and the process is repeated. A write address FIFO 66, under control of the instruction register and decoder 60, is operative to hold data memory write addresses until such time as data output results from the pipelined arithmetic and logical unit are available and the data memory 58 is capable of accepting a write. A read address latch 67, under control of the instruction register and decoder 60, is operative to hold a data memory read address for data memory reads.

The pipeline control sequencer 54 is operative to provide all the register addresses and logic function control microcode for all the possible configurations of the pipelined arithmetic and logical unit. The pipeline control sequencer 54 includes a pipeline control sequencer start address register 68 controlled by the instruction register and decoder 60 of the address generator 52. The pipeline control sequencer start address register 68 is connected to a pipeline control sequencer address counter 70 which in turn is connected to a pipeline control sequencer control store RAM 72. The output of the RAM 72 is connected to a latch 74 which is connected over a 52 bit instruction bus to a pipelined arithmetic and logical unit 76. As above-described, the master processing unit 12 (FIG. 1) during initialization writes an address generator register, not shown, with the start address for one of a plurality of pipeline control sequencer functions, and writes the individual addressable locations of the pipeline control sequencer control store RAM 72 with pipeline arithmetic and logical unit control microcode. The microcode is stored in addressable blocks of RAM 72 memory locations each block of which corresponding to one of a plurality of computationally intensive functions such as Fast Fourier Transforms, matrix inversions, vector multiplications, matrix multiplications, and other functions. During initialization, the master processing unit 12 (FIG. 1) also loads a register of the address generator 52, not shown, with write data FIFO parameters for use with a counter 75 to be described.

After a preselected time delay selected to allow the address generator 52 sufficient time to generate the initial one of the sequentially provided data memory read addresses, and to allow the data memory to read the corresponding data values on the data memory output bus, the address generator 52 supplies the above-described start enable signal to the pipeline control sequencer 54 and loads the pipeline control sequencer address register 68 with the start address for a selected one of the plurality of user-selectable functions. The instruction corresponding to the particular start address is written from the pipeline control sequencer store RAM 72 into the microcode latch 74 and is applied over the 52 bit microinstruction bus to the pipelined arithmetic and logical unit 76. The address generator 52 also loads at this time the counter 75 with an algorithm-specific data parameter and enables the pipeline control sequencer address counter 70. The pipeline control sequencer address counter 70 then supplies the control store RAM 72 the starting address that corresponds to the location of the first microcode instruction which is written to the microinstruction latch 74 and is applied over the 52 bit instruction bus to the pipelined arithmetic and logical unit 76 for evaluation in time synchronization with the data value applied thereto under control of the address generator 52 that corresponds to the read address for that particular clock pulse. With each successive clock pulse, the address generator 52 and the pipeline control sequencer 54 are cooperative to supply the pipelined arithmetic and logical unit 76 the next data memory read address in time synchronization with the next microcode control word. This process continues until data is available at a data output port of the pipelined arithmetic and logical unit 76.

When output data is available, it is applied to a write data FIFO 78 by the action of a pipeline control sequencer bit in the current microcode instruction in combination with the FIFO write enable count down counter 75 having counted down to the appropriate algorithm specific data parameter supplied thereto as above-described. When the write address FIFO 66 has at least one address and the write data FIFO 78 has two or more data output values, the output data is written into the data memory 58 using an address specified by the write address FIFO 66. Data written into either the write address FIFO 66 or the write data FIFO 78 on one clock pulse may be read out on the next clock pulse. It will be appreciated that the write data FIFO 78 is used to hold write data which is generated by the pipelined arithmetic and logical unit 76 but which cannot be written back into the data memory 58 on the clock pulse during which it is generated because the data memory 58 is busy doing a read.

The data input to the arithmetic and logical unit 56 of the address generator 52 is provided via three latches 80, 82, 84, and a bit reverse register, BREV, 85. Latches 80, 82, and 84 are load enabled by selected bits of the bit field of the current microinstruction in the microinstruction latch 74. A character 87, output enabled by the instruction register and decoder 60, is operative to controllably select and combine the data from the latches 80, 82, and 84. The latches 80, 82, and 84, and the BREV 85 allow the arithmetic and logical unit 56 to perform data memory output value dependent address generation and pipeline output dependent address generation useful in histogram building, iterative function evaluation and other data-dependent table look-up addressing.

Figure 3:
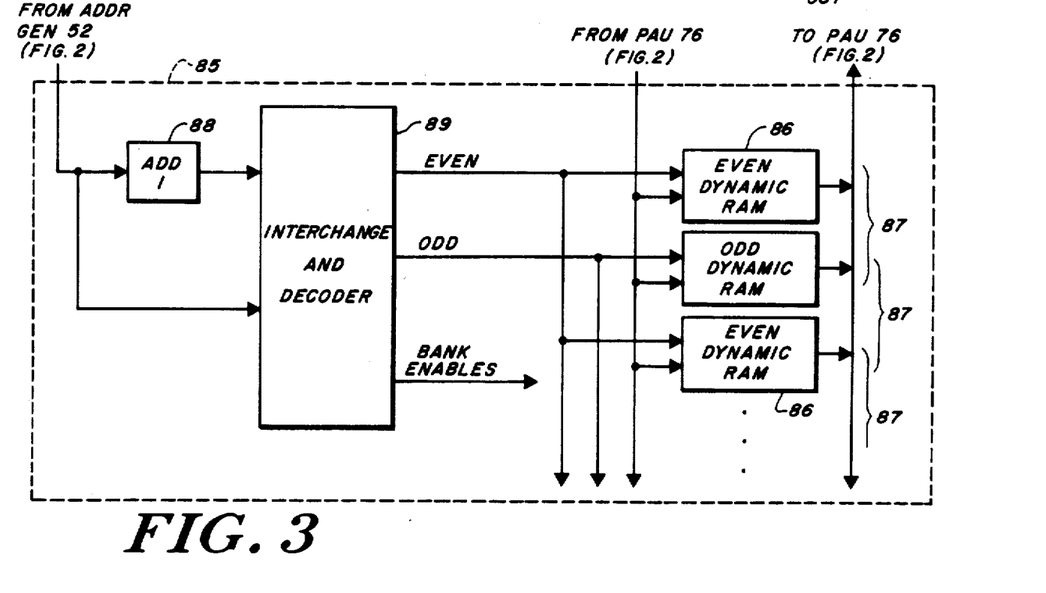
FIG. 3 is a block diagram of the interleaved dynamic RAM data memory of the full floating point vector processor according to the present invention.

Referring now to FIG. 3, generally shown at 85 is a block diagram of an interleaved dynamic RAM data memory of the full floating point vector processor according to the present invention. The data memory 85 includes dynamic RAM 86 preferably interleaved into a plurality of pairs of even and odd banks as designated by brackets 87 and connected in parallel to the pipelined arithmetical and logical unit 76 (FIG. 2), for data reads and writes thereto from and to selected bank pairs. For each address produced by the address generator 52 (FIG. 2), the address is incremented by a count of one as designated by a block 88 to provide a pair of adjacent interleaved dynamic RAM addresses one of which is "even" and the other of which is "odd". An address interchanger and decoder 89 is operative in response to successive ones of the pairs of interleaved dynamic RAM addresses to appropriately interchange the RAM addresses whenever an odd address is specified by the address generator 52 (FIG. 2) so as always to provide an even dynamic RAM address on the even output bus and to provide an odd address on the odd address bus of the interchanger and decoder 89. The interchanger and decoder 89 is responsive to the absolute value of the interleaved dynamic RAM addresses to enable the corresponding one of the bank pairs 87. During each of successive memory cycles, the odd and the even dynamic RAM banks of the selected interleaved bank pair are operative in response to the pair of addresses to provide two data words time sequentially upon each clock pulse to the pipelined arithmetic and logical unit 76 (FIG. 2) for each address generator supplied read address, and to accept two data values time sequentially upon each clock pulse from the pipelined arithmetic and logical unit 76 (FIG. 2) for each address generator supplied write address.

Figure 4:
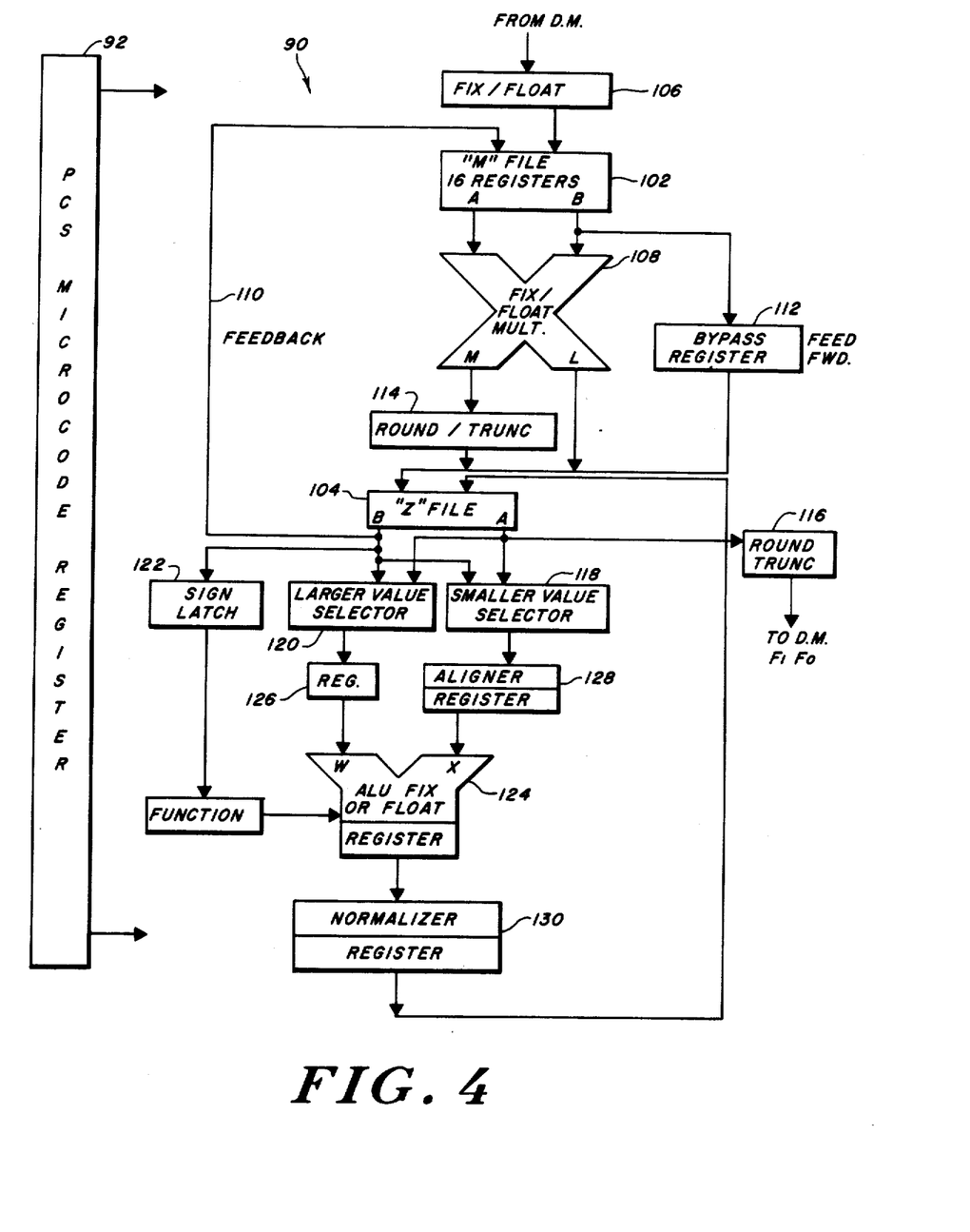
FIG. 4 is a block diagram of the pipelined arithmetic and logical unit of the full floating point vector processor according to the present invention.
Figure 5A:
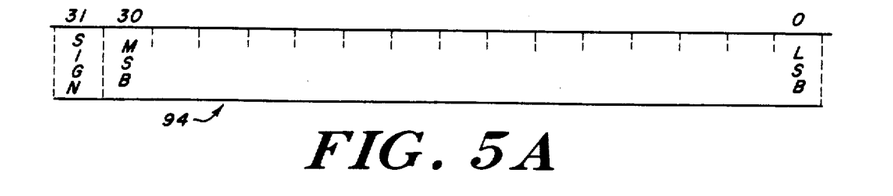
FIG. 5A is a diagram illustrating one of the data formats of the full floating point vector processor according to the present invention.
Figure 5B:
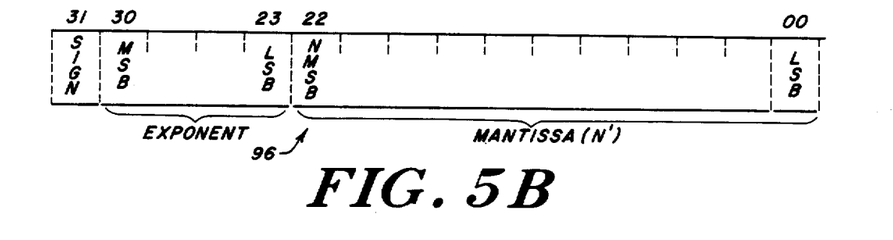
FIG. 5B is a diagram illustrating another data format of the full floating point vector processor according to the present invention.
Figure 5C:
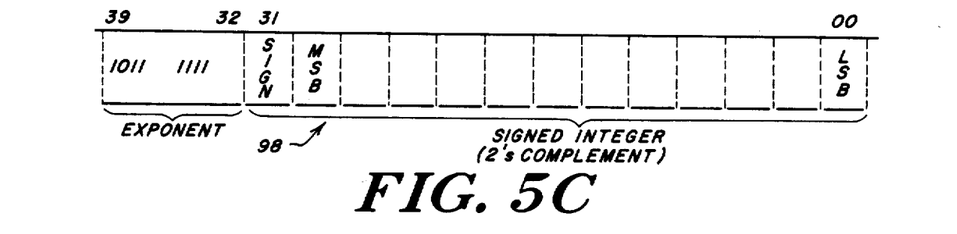
FIG. 5C is a diagram illustrating one of the formats of the pipelined arithmetic and logical unit fo the full floating point vector processor according to the present invention.
Figure 5D:
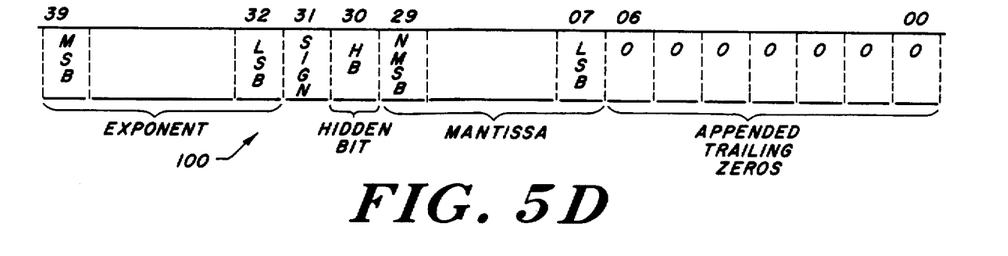
FIG. 5D is a diagram illustrating another format of the pipelined arithmetic and logical unit of the full floating point vector processor according to the present invention.

Referring now briefly to FIG. 4, generally shown at 90 is a block diagram of a pipelined arithmetic and logical unit of the full floating point vector processor of the present invention. The pipelined arithmetic unit 90 is a configurable multifunction pipeline under control of a pipeline control sequencer microinstruction contained in a program control sequencer microcode register 92. As above-described, the pipeline control sequencer 54 (FIG. 2) is operative to controllably provide for each clock pulse the next microcode instruction to be executed in the pipeline 90, as shown by the arrows directed to the right from the pipeline control sequencer microcode register 92. Each microcode instruction is a particular bit pattern that preferably defines a 52 bit horizontal format bit field. Data from the data memory 58 (FIG. 2) is written to the pipeline 90 synchronously with each microcode instruction written thereto from the pipeline control sequencer 54. For each clock pulse, preferably every 160 nanoseconds, a 32-bit data word is available from data memory.

There are two formats for data stored in the data memory and two formats for data stored in or passing through the pipelined arithmetic and logical unit 90 (FIG. 4) as shown in FIG. 5. Fixed or integer format data for data stored in the data memory is shown by a block generally designated 94 in FIG. 5A. The least significant data bit occupies the right hand "0" position, the most significant data bit occupies bit position 30, and bit position 31 is occupied by a value representative of sign. Floating point format data for data stored in the data memory is shown by a block generally designated 96 in FIG. 5B. The mantissa of the data value occupies bit positions 0 through 22, the exponent of the data value occupies bit positions 23 through 30, and the sign bit occupies bit position 31. The sign bit for both formats is assigned a binary "0" to designate a positive data value and a binary "1" is assigned to designate a negative data value. In the floating point format, the exponent is defined as an offset binary value with a bias of +128; that is, an exponent value of +127 corresponds to a 1111 1111 binary representation, an exponent value of 0 corresponds to a binary representation of 1000 0000, an exponent value of −127 corresponds to a binary value of 0000 0001, and absolute zero corresponds to a binary representation of 0000 0000. The mantissa portion of the floating point format preferably is selected to correspond to DEC floating point format in that the range of the mantissa is defined by the relation $0.5 < N < 1.0$, where N is the mantissa. Since in DEC floating point format, the most significant bit of the mantissa is always a binary "1", it is not stored in data memory. The next to the most significant bit, designated NMSB, is the bit weighted $2^{}(-2)$. The least significant bit of the mantissa is weighted $2^{}$ (−24). The range of the mantissa is 0.99999994 decimal to 0.50000000 decimal.

The data paths internal to the pipelined arithmetic and logical unit 90 (FIG. 4) preferably are 40 bits wide to provide increased accuracy, and have two formats corresponding to the fixed point and to the floating point data formats. As shown generally at 98 in FIG. 5C, the 32 bit data words of the fixed point or integer formats are placed in the 0 through 31 bit positions and an exponent of $2^{**}(+31)$ is positioned in the 32 through 39 bit positions of the 40 bit pipeline format field. As shown generally at 100 in FIG. 5D, for the floating point pipeline data format, bit positions 0 through 6 are filled with trailing zeros, bit positions 7 through 29 are filled with the mantissa portion of the data value, bit position 30 is filled with a so-called hidden bit, bit position 31 is filled with the sign bit, and bit positions 32 through 39 are filled with the exponent portion of the data value.

Returning now to FIG. 4, the pipeline arithmetic and logical unit 90 includes a M register file 102 and a Z register file 104. Data is supplied to the M register file 102 through a fixed/floating point converter 106 operative to provide under microcode control on-the-fly format convertion to a selected one of either integer format or floating point format. The M and the Z register files 102 and 104 each preferably comprise 16 addressable read/write registers of 40 bits each. The M and the Z register files 102 and 104 each have two input ports, and two output ports designated "A" and "B", and are responsive to each clock pulse to perform two writes into the files over the corresponding input ports and two reads out of the files over the corresponding output ports to and from addressable locations specified by the microinstructions supplied thereto from the pipeline control sequencer microinstruction register 92 via the pipeline control sequencer 54 (FIG. 2) for each clock pulse. In the preferred embodiment, each such microcode is 52 bits wide. Bits 00 through 11 thereof specify in adjacent 4-bit groups designated MF1, MF2, and MF3 two read M file addresses and two write M file addresses, with one of the reads being to an address specified for a write. Bits 12 through 23 thereof specify in adjacent 4-bit groups designated ZF1, ZF2, and ZF3 two read Z file addresses and two write Z file addresses, again with one of the reads being to an address specified for a write.

The M file 102 and the Z file 104 are controllably interconnected by a two input, two output (designated "M" and "L") user-selectable fixed/floating point multiplier 108, a feedback path 110 connected between the "B" output port of the Z file and one of the input ports of the M file, and a feedforward path 112 having a microcode controlled latch connected between the "B" output port of the M file 102 and one of the input ports of the Z file 104. A round/truncate control 114 is provided between the "M" output port of the multiplier 108 to one of the inputs of the Z file 104. The fixed/floating multiplier 108, the feedback path 110, the feedforward path 112, and the round/truncate control 114 are controllably selected by corresponding preselected control bits of the pipeline control sequencer microcode provided thereto from the microinstruction register 92 every clock pulse.

The multiplier 108 is a fixed or a floating point multiplier that performs a 31×32 bit multiply in either two's complement for integer format operations or in sign-magnitude for floating point format operations. The resulting product is a full 64 bits, 32 most significant bits followed by 32 least significant bits. A predetermined portion of the bit field of the pipeline control sequencer microcode instruction specifies either the 32 most significant bits or the 32 least significant bits for writing into the Z file 104. A predetermined portion of the bit field of the pipeline control sequence microcode instruction also specifies the direct write of data values at the output of the M file into the input port of the Z file. The round/truncate control 114 is operative likewise under microcode control to truncate multiplier output values in the usual manner and employs standard "or" rounds.

The multiplier can perform a new multiplication every 320 nanoseconds. Adjacent 160 nanosecond clock pulses are divided into "odd" and "even" pulses. The above referred to MF1 bit field of the pipeline control sequencer microcode specifies the address from which the multiplier 108 input is read out of the M file 102 on an even clock cycle and specifies the address into which data provided over the feedback path 110 may be written into the M file 102 on either an odd or an even clock cycle. The above referred to MF2 bit field of the pipeline control sequencer microcode specifies the M file address into which the data from the data memory is written on either an odd or even clock cycle. The above referred to MF3 bit field of the pipeline control sequencer microcode specifies the address from which data is written into the multiplier 108 input on an even clock cycle and also specifies the address from which M file data is read to bypass the multiplier 108 over the feedforward path 112 on either even or odd clock pulses.

"A" output port of the Z file 104 is connected to a round/truncate control 116 that feeds pipeline arithmetic unit output data values to the write data FIFO, to a smaller value selector 118, and to a larger value selector 120. The "B" output port of the Z file 104 is connected to a sign latch 122, to the larger value selector 120, and to the smaller value selector 118. The sign latch 122 is connected to a fixed or a floating point format arithmetic and logical unit 124 having two inputs designated "W" and "X". As shown by the block labelled "function" in the sign latch connection to the ALU 124, the sign latch under mircocode control provides the ALU 124 with a data dependent decision making capability. The larger value selector 120 is connected to the arithmetic and logical unit 124 via a register 126, and the smaller value selector 118 is connected to the arithmetic and logical unit 124 via an aligner/register stage 128. The output of the arithmetic unit 124 is connected via a normalizer stage 130 back to one of the input ports of the Z file 104. The output of the round/truncate control 116 is connected to the data write FIFO 78 (FIG. 2). The arithmetic and logical unit 124 preferably is a full 35 bit adder designed to accept either floating point or integer format data values. It performs operations on integers in signed two's complement notation, and it performs operations on mantissas in signed-magnitude notation.

The Z file 104 operates in a similar manner to the M file 102. The current microinstruction in the pipeline control sequencer microcode register 92 specifies two Z file reads followed by two Z file writes every clock cycle. Like the M file, one address is for a read, one address for a write, and one address is for a read followed by a write. The above referred to ZF4 bit field of the pipeline control sequencer supplied microinstructions specifies the address from which data for the arithmetic and logical unit 124 is read from the "B" output port of the Z file 104 or specifies that the data value contained thereat is to be read to one of the M file 102 input ports over the feedback path 110 on either an even or an odd clock cycle. The ZF4 bit field also specifies the address of the Z file "B" port into which either the product out of the multiplier "C" output port or the bypass 112 data value is written on an odd clock cycle and further specifies where the bypass 112 data value is written on an even clock cycle. The above referred to ZF5 bit field of the pipeline control sequencer supplied microinstruction specifies the address into which the output of the normalizer 130 is written on an even or an odd clock cycle. The above referred to ZF6 bit field of the pipeline control sequencer supplied microinstruction specifies the address from which the arithmetic and logical unit 124 is supplied with a data value from the "A" output port of the Z file 104 or specifies the address from which output data values are read to the data memory write FIFO 78 (FIG. 2) from the "A" output port of the Z file on either an even or an odd clock cycle. Preselected ones of the bits of the bit field of the microinstruction provided by the pipeline control sequencer also specifies the product of the fixed/floating multiplier 108, the data value supplied via the bypass register 112, or the output of the normalizer 130 as that data value to be written into the Z file 104.

For a particular pipeline configuration, the "A" output port data value and the "B" output port data value of the Z file 104 are compared magnitude-wise upon the occurance of each clock pulse. The larger magnitude is latched under microcode control in the register 126 for input into the W input of the arithmetic and logical unit 124. The smaller magnitude, also under microcode control, is down shifted by the amount of the difference in the two exponent fields of the compared data values and the down shifted result is latched in an aligner register of the aligner and register 128 for input into the "X" input port of the arithmetic and logical unit 124. The latching of the two aligned values in the latches 126 and 128 is under microcode control and allows the arithmetic and logical unit 124 to generate the sum, followed by the difference, or any other arithmetic or logical operation, of the two latched and aligned values in the arithmetic and logical unit 124 in a manner that permits the passing of data values out of the Z file either back to the M file over the feedback path 110 or to the data write FIFO without the loss of an arithmetic and logical unit clock cycle. A corresponding bit in the bit field of the microcode word of the pipeline control sequencer instruction register can also be specified to inhibit the alignment operation, for example when passing integer values to the arithmetic and logical unit 124.

The normalizer stage 130 under control of a corresponding bit field of the pipeline control sequencer microinstruction word examines the data output of the arithmetic and logical unit 130 and upshifts the result until there are no longer any leading zeros. The number of leading zeros is subtracted from the exponent. If an overflow of the mantissa occurs during addition, the exponent is incremented and the mantissa downshifted. If the resulting exponent exceeds the maximum or is less than the minimum allowed value, the exponent and the mantissa are clamped at the maximum or minimum value respectively, and an overflow or an underflow flag is set. If the mantissa is zero, the exponent is set at the minimum value, and the underflow flag is not set. The normalization operation can be suppressed under microcode control, for example when passing integer data format back into the Z file.

After data values are streamed through the microinstruction configured pipeline, the resulting data output values representative of function evaluation are written to data memory from the Z file 104 via the round/truncate control 116, where the floating point format can be either rounded or truncated in the unit 116 as selected by a corresponding bit field of the microcode control word in the usual manner. The table following immediately below is a summary of the preferred bit positions of the bit field of the pipeline control sequencer microinstructions that are employed to controllably configure the pipeline upon the occurence of each clock pulse.

| BIT | FUNCTION |
| --- | --- |
| 0–3 | M File B Address (first) |
| 4–7 | M File B Address (second) |
| 8–11 | M File A Address |
| 12–15 | Z File B Address (first) |
| 16–19 | Z File B Address (second) |
| 20–23 | Z File A Address |
| 24 | Writes Data Memory Output into M File |
| 25 | Fix/Float Format for Output of Data Memory Written into M File |
| 26 | Select Most-Significant-Half Product |
| 27 | Multiply in Fixed Point |
| 28, 29 | Selection of Bypass, Product, or nothing, to be Passed to Z file |
| 30 | Round Product |
| 31 | Enable Feedback |
| 32 | Latch Aligned values |
| 33 | Enable Alignment |
| 34 | Save Sign of B Port Value |
| 35 | Use Saved Condition to Control ALU Operation |
| 36–38 | ALU Function Code |
| 39 | ALU Operations Performed in 2's Complement (fixed point) |

-continued

| BIT | FUNCTION |
|---|---|
| 40 | Force Absolute value |
| 41 | Enable Normalization |
| 42 | Write Output of Normalizer to Z File |
| 43 | Fix to Float Control |
| 44 | Write "A" Port of Z File to FIFO |
| 45 | Write Data to FIFO in Fixed Point Format |
| 46 | Round Floating Point Mantissa Sent to Data FIFO |
| 47 | Latches 80 and 82 Enable |
| 48 | Address Counter Reload Enable |
| 49, 50 | Reserved for Future |
| 51 | Latch 84 Enable |

Figure 6A:
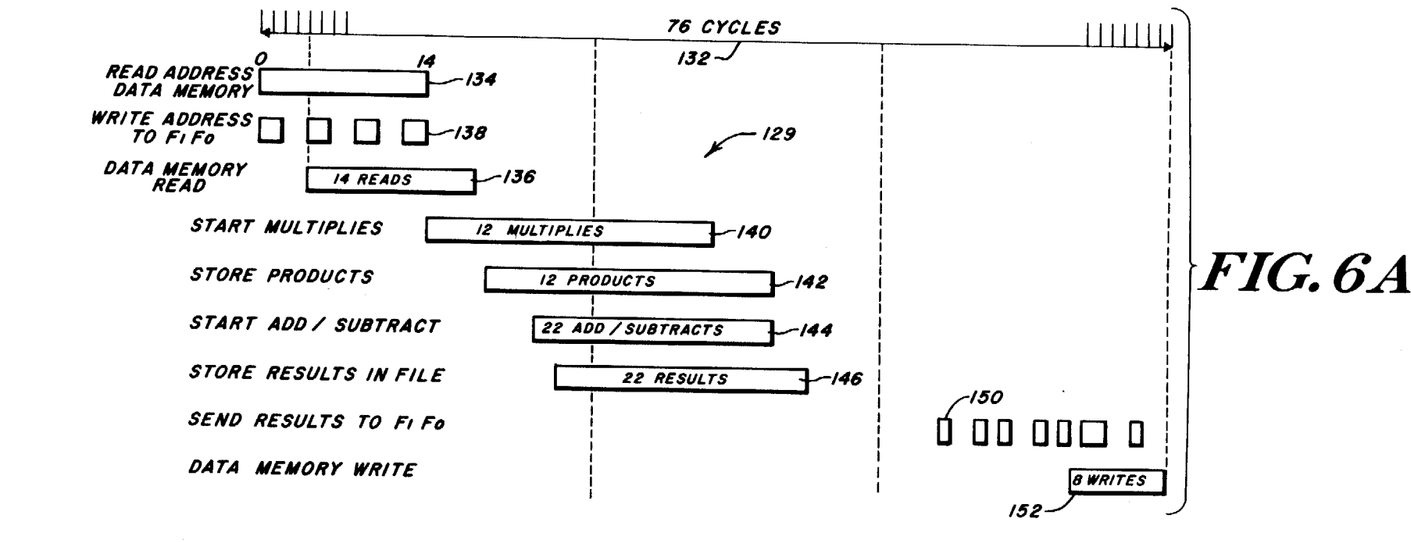
FIG. 6A is a diagram showing the utilization of the full floating point vector processor when executing an exemplary 1024 point FFT according to the present invention.

Referring now to FIG. 6A, generally designated at 129 is a schematic diagram illustrating the operation of the novel full floating point vector processor when executing an exemplary 1024 point fast fourier transform, FFT. A sequence of vertical tick marks 132, extending for 76 ticks, is shown at the upper part of the figure. Adjacent ones of the ticks correspond to even and odd clock pulses. At the first even clock pulse, at the left hand side of the figure, a block 134 extending for 14 clock pulses illustrates the generation of addresses by the address generator 52 (FIG. 2) for loading of data from the data memory into the M file register 102 (FIG. 4). After four clock cycles, a block 136 extending again for 14 clock cycles illustrates the loading of the data values specified by the corresponding addresses into the M file register 102. Block 138 illustrates the operation of the address generator for loading the write addresses into the write address FIFO 66 (FIG. 2) at which locations output data values are written during 1024 point FFT evaluation in the pipeline. A block 140 illustrates the operation of the multiplier 108 (FIG. 4) which performs 12 multiplies on data selectively written thereinto from the M file 102, each multiply requiring as above-mentioned two clock cycles for a total of 24 clock pulses, as illustrated. It will be appreciated that the pipeline architecture permits the beginning of multiplier operation at a time prior to the completion of the data read address generation, as illustrated by the time skewed block locations, thereby speeding system performance, data throughput, and function evaluation.

Figure 6B:
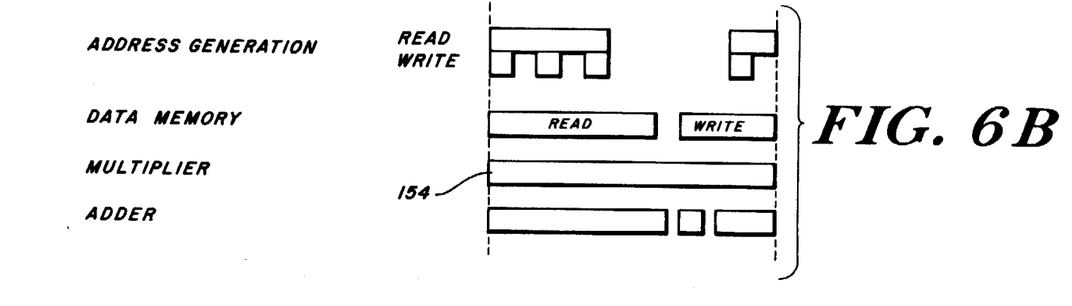
FIG. 6B is another diagram illustrating the operation of the full floating point vector processor when executing an exemplary 1024 point FFT according to the present invention.

A block 142 illustrates that multiplier output products are transferred likewise in time-overlap fashion from the multiplier 108 (FIG. 4) to the Z file 104 (FIG. 4) again for 24 clock pulses. A block 144 illustrates the operation of the ALU 124 (FIG. 4) for 22 clock pulses, likewise in time-overlap fashion. The ALU begins to perform a total of 22 additions and subtractions four clock pulses after multiplier output product storage in the Z file the results of which are sent for storage to the Z file 104 (FIG. 4) two clock pulses later as shown by a block 146. After function evaluation on the streamed data vectors is complete, pipeline output data values representative thereof are written in the write data FIFO 78 (FIG. 2) as shown by a block 150, and written into the DM 58 (FIG. 2) utilizing the write address FIFO 66 (FIG. 2) addresses therefor as shown by a block 152, for eight sequential writes. FIG. 6B is a composite diagram illustrating how the sequential pipeline operations for the exemplary 1024 point FFT are overlapped for sequential data vectors to provide for one hundred percent multiplier utilization as designated by the unbroken block 154 and the adder and data memory are each utilized during 22 of every 24 cycles, or 91.7 percent utilization. FIG. 6B also illustrates the speed-up in system throughput from the 76 cycles of FIG. 6A to the 24 cycles extending between the two dashed verticle lines during which interval the evaluation of the 1024 point FFT is completed in the pipeline for sequential data vectors streamed therethrough. By way of example and not by way of limitation, the 1024 point complex FFT evaluation takes 4.7 milliseconds.

It will be appreciated that many modifications of the full floating point vector processor of the present invention will be apparent to those skilled in the art without departing from the inventive concept.

What is claimed is:

1. A full floating point vector processor, comprising:
a master processing unit;
first means coupled to said master processing unit and having an input and an output bus for providing a plurality of addressable memory locations;
second means coupled to said first means and to said master processing unit for loading data to be evaluated in said addressable memory locations;
third means coupled to said first means and to said master processing unit and operative concurrently with said master processing unit for providing a plurality of time sequential memory read and write addresses, and for providing a selectively delayed control signal;
said first means are operable in response to individual ones of said plurality of time sequential memory read addresses to provide the corresponding data loaded at individual ones of said memory read addresses on said output bus and operable in response to individual ones of data memory write addresses to load the corresponding data on said input bus to said write memory address;
fourth means coupled to said first means, to said third means, and to said master processing unit and operative concurrently with both said master processing unit and said third means in response to said delayed control signal for providing a plurality of time sequential microinstructions in time-synchronization with corresponding ones of said plurality of time sequential memory read and write addresses; and
fifth means coupled to said first means, to said fourth means and concurrently operative with said master processing unit, said third means, and said fourth means in response to said time sequential data on said output bus and to said synchronously supplied microinstructions for evaluating in accordance with said synchronously applied microinstructions one of a preselected plurality of computationally intensive functions on said data on said output bus and for providing a data value on said input bus representative of said evaluation of said selected one of said plurality of computationally intensive functions, said fifth means including a dynamically configurable multifunction pipelined arithmetic and logical unit having an M register file and a Z register file selectively interconnectable under microinstruction control by way of both a feedforward and a feedback path, wherein each of said M and said Z register files are 4 port devices having two input ports and two output ports and are operative in response to individual ones of said plurality of microinstructions to provide two writes thereinto and two reads therefrom.

2. The full floating point vector processor of claim 1, wherein said master processing unit is a 68000 supermicroprocessor chip.

3. The full floating point vector processor of claim 1, wherein said first means includes static RAM.

4. The full floating point vector processor of claim 1, wherein first means include interleaved dynamic RAM.

5. The full floating point vector processor of claim 4, wherein said interleaved dynamic RAM is arranged into even and odd bank pairs operative to provide two words in response to each said time sequential memory read addresses and to accept two values in response to each said time sequential memory write addresses.

6. The full floating vector processor of claim 1, wherein said second means includes a direct memory access controller connected to a host interface.

7. The full floating point vector processor of claim 1, wherein said second means includes a RS-232 interface operatively connected to said master processing unit.

8. The full floating point vector processor of claim 1, wherein said second means includes a UNIBUS interface operatively connected to said master processing unit.

9. The full floating point vector processor of claim 1, wherein said second means includes a MULTIBUS interface operatively connected to said master processing unit.

10. The full floating point vector processor of claim 1, further including at least two I/O ports operatively connected to said first means.

11. The full floating point vector processor of claim 1, wherein said third means includes an address generator having a control store RAM loadable by said master processing unit with address generation control loops, a start register loadable by said master processing unit with a start address corresponding to a selected one of said address generation control loops, and an address generator arithmetic and logical unit connected to said address generator control store RAM and operative in response to said selected address generator control loop for providing said plurality of time sequential data memory read and write addresses.

12. The full floating point vector processor of claim 11, further including a write address FIFO connected between said address generator arithmetic and logical unit and said first means.

13. The full floating point vector processor of claim 11, further including a write data FIFO connected between said input bus and said fifth means.

14. The full floating point vector processor of claim 11, wherein said fourth means includes a pipeline control sequencer having a pipeline control sequencer control store RAM loadable by said master processing unit with pipeline control sequencer microinstruction loops each corresponding to one of said plurality of computationally intensive functions to be evaluated, and wherein said pipeline control sequencer includes a start address register loadable by said address generator with the start address of a selected one of said plurality of computationally intensive functions.

15. The full floating point vector processor of claim 1, wherein said dynamically configurable multifunction pipelined arithmetic and logical unit includes an arithmetic and logical unit and a sign bit latch, said sign bit latch connected between said Z file and said arithmetic and logical unit and operative in response to said microinstructions to provide said arithmetic and logical unit with a data dependent decision making capability.

16. A vector processor, comprising:
a clock for providing a sequence of discrete clocking signals;
a data memory for storing data vectors to be evaluated and for storing data values after evaluation;
a master processing unit coupled to said data memory and to said clock;
an interface connected to said master processing unit and coupled to said data memory for loading said data memory with said data vectors to be evaluated and for offloading said data values after evaluation;
an address generator, coupled to said data memory and to said master processing unit, operative in response to said clock for controllably providing a data memory read address upon the occurence of each clocking signal;
a pipeline control sequencer, connected to said master processing unit and coupled to said address generator and concurrently operative therewith, operative in response to said clock and to said address generator for providing a microinstruction, having a fully programmable horizontal format bit field, upon the occurence of every clocking signal, concurrently with corresponding ones of said data memory read addresses and in time synchronization therewith; and
a pipeland arithmetic and logical unit coupled to said pipeline control sequencer and to said data memory and operative in response to individual ones said microinstructions and said clocking signal for evaluating selected ones of a plurality of computationally intensive functions on the data specified by said data memory read addresses, said pipelined arithmetic and logical unit including an M file register and a Z file register coupled to said pipeline control sequencer and selectively interconnectable under microinstruction control by way of both a feedforward and a feedback path with each of said M and Z file registers having two inputs and two outputs, and being operative in response to preselected bit fields of said horizontal format fully programmable microinstructions for performing two reads and two writes upon the occurence of each clock pulse.

17. The vector processor of claim 16, further including a write address FIFO connected between said address generator and the input of the pipelined arithmetic and logical unit.

18. The vector processor of claim 16, wherein said address generator is operative to generate write data addresses, and further including a write data FIFO connected between the output of said pipelined arithmetic and logical unit and said data memory.

19. The vector processor of claim 17, wherein said write address FIFO is coupled to said pipeline control sequencer and is controlled by a preselected bit field of said fully programmable horizontal format microinstructions.

20. The vector processor of claim 18, wherein said write data FIFO is coupled to said pipeline control sequencer and is controlled by a preselected bit field of said fully programmable horizontal format microinstructions.

21. The vector processor of claim 16, wherein said pipelined arithmetic and logical unit includes an arithmetic and logical unit connected to said Z file via a sign latch operative under a preselected bit field of said fully programmable horizontal format microinstructions to provide said arithmetic and logical unit with sign information to controlably provide data-dependent decision making.

22. The vector processor of claim 16, wherein said address generator includes an arithmetic and logical unit, and further includes at least one latch, enabled by a preselected bit field of said fully programmable horizontal format microinstructions, connected between said data memory and said address generator arithmetic and logical unit, for providing data memory output dependent address generation.

23. The vector processor of claim 16, wherein said address generator includes an address generator arithmetic and logical unit, and further includes at least one latch, enabled by a preselected bit field of said fully programmable horizontal format microinstructions connected between said pipelined arithmetic and logical unit and said address generator arithmetic and logical unit, for providing pipeline output dependent address generation.

24. The vector processor of claim 16, further including a write address FIFO connected between said pipelined arithmetic and logical unit and said data memory, and a counter connected between said address generator and said write address FIFO, said write address FIFO enabled by a preselected bit field of said fully programmable horizontal format microinstruction and said counter having counted down to a predetermined value.

25. The vector processor of claim 16, wherein said interface is a UNIBUS interface.

26. The vector processor of claim 16, wherein said interface is a MULTIBUS interface.

27. The vector processor of claim 16, wherein said interface is a RS-232 serial line.

28. The vector processor of claim 16, further including at least two auxiliary I/O ports connected to said data memory.

29. The vector processor of claim 16, wherein said data memory includes dynamic RAM connected in parallel even and odd bank pairs and operative in response to each address specified by said address generator to serially provide two data words.

30. A vector processor operative in one of a fixed or a floating point format and operative in one of a tightly coupled, loosely coupled, and an uncoupled mode; comprising:

a clock for providing clock pulses;
a master processing unit coupled to said clock;
a data memory coupled to said clock and to said master processing unit;
means connected to said clock and to said master processing unit for providing direct memory access for loading data into and out of said data memory;
a first processor connected in parallel with said master processing unit and coupled to said clock and said data memory for providing data memory write and read addresses upon each clock pulse occurence;
a second processor connected in parallel with said master processing unit and said first processor coupled to said clock and operative in response to said first processor for providing a horizontal format microinstruction upon each clock pulse occurence in time synchronization with individual ones of said data memory write addresses; and
a controllably configurable pipelined arithmetic and logical unit connected to said data memory, said second processor and said clock and responsive to the data values specified by said data memory write addresses and to said microinstructions upon every clock pulse for evaluating a computationally intensive function on said data, said pipelined arithmetic and logical unit including a first register file and a second register file selectively interconnectable by a feedforward and a feedback path under microinstruction control and operative upon each clock pulse to perform two writes into the register files and two reads out of the register files.

31. The vector processor of claim 30, wherein each of said register files has two input and two output ports, and wherein one of said writes is to an address specified for a read.

32. The vector processor of claim 31, wherein said output ports of said first register file are connected to the input ports of a two input port multiplier having two output ports that are connected to one of the input ports of the second register file.

33. The vector processor of claim 32, wherein the output ports of the second register file are connected to the two input ports of a two input port arithmetic and logical unit having one output port that is connected back to one of the input ports of the second register file.

34. The vector processor of claim 33, further including a sign latch connected between one of the output ports of said register file and said arithmetic and logical unit and operative under microinstruction control and operative to provide data dependent decision making capability for said arithmetic and logical unit.

35. The vector processor of claim 34, wherein said pipelined arithmetic and logical unit includes means connected between said data memory and said first register file under microinstruction control for providing on-the-fly, fixed and floating format conversion.

* * * * *